United States Patent
Fortela et al.

(10) Patent No.: US 10,564,019 B2
(45) Date of Patent: Feb. 18, 2020

(54) INFRARED-BASED GAS FLOWMETER

(71) Applicant: University of Louisiana at Lafayette, Lafayette, LA (US)

(72) Inventors: Dhan Lord B. Fortela, Lafayette, LA (US); Kyle S. Farmer, Lafayette, LA (US); Nicholas S. Marcil, Lafayette, LA (US); Wayne W. Sharp, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 16/168,059

(22) Filed: Oct. 23, 2018

(65) Prior Publication Data
US 2019/0128717 A1    May 2, 2019

Related U.S. Application Data

(60) Provisional application No. 62/575,668, filed on Oct. 23, 2017.

(51) Int. Cl.
*G01F 1/704* (2006.01)

(52) U.S. Cl.
CPC .................................. *G01F 1/704* (2013.01)

(58) Field of Classification Search
CPC ........................................................ G01F 1/704
See application file for complete search history.

(56) References Cited

U.S. PATENT DOCUMENTS

| 7,267,798 B2* | 9/2007 | Chandler | G01N 15/1456 356/72 |
| 9,381,523 B2* | 7/2016 | Marsh | B04B 11/04 |

* cited by examiner

*Primary Examiner* — Jewel V Dowtin
(74) *Attorney, Agent, or Firm* — Russel O. Primeaux; Lauren J. Rucinski; Kean Miller LLP

(57) ABSTRACT

The invention is a gas flowmeter that produces precise flow measurements at low-flowrate ranges (for example, between 0.25 mL/min to 5,000 mL/min). It uses an infrared ("IR") beam to detect the passing of a gas bubble through a liquid within a glass column. A "broken" beam is detected by the microcontroller for each passing of a bubble. This ability to allow the IR beam to be broken exactly at the passing of a bubble is made possible by the slit-over-slit design at the sides of the glass column and the column holder.

15 Claims, 6 Drawing Sheets

FIGURE 6

```
#include <LiquidCrystal.h>
#include <SPI.h>
#include <SD.h>
#include <Wire.h>
#include "RTClib.h"

#define LEDPIN 13
#define SENSORPIN 2

RTC_DS3231 rtc;

File myFile;

int pinCS = 4;
int x = 0;
int y = 0;
float count = 0;
float seconds = 0;
unsigned long timer = 0;
int sensorState = 0, lastState=0;

LiquidCrystal lcd(9, 8, 7, 6, 5, 3);

void setup() {
  #ifndef ESP8266
    while (!Serial); // for
Leonardo/Micro/Zero
  #endif Serial.begin(9600);
  if (! rtc.begin()) {
    Serial.println("Couldn't find RTC");
    while (1);
  }
  pinMode(LEDPIN, OUTPUT);
  pinMode(SENSORPIN, INPUT);
  digitalWrite(SENSORPIN, HIGH);
  lcd.begin(16, 2);
  lcd.clear();
  pinMode(pinCS, OUTPUT);
  if(!SD.begin(4)) {
    Serial.println("Initialization
failed");
    return;
  }
  Serial.println("Initialization
complete");
  lcd.setCursor(0,0);
  lcd.print("bubble count:");
}
```

```
void loop() {
  DateTime now = rtc.now();
  sensorState = digitalRead(SENSORPIN);
  if (sensorState == LOW) {
    digitalWrite(LEDPIN, HIGH); }
  else {
    digitalWrite(LEDPIN, LOW);
    }
  if (sensorState && !lastState) {
    Serial.println("Unbroken");
    }
  if (!sensorState && lastState) {
    count = count +1;
    Serial.print("Broken ");
    Serial.println(count);
    myFile = SD.open("test.txt",
FILE_WRITE);
    if(myFile){
      Serial.print(now.minute(), DEC);

myFile.print(now.year(), DEC);
      myFile.print('/');
      myFile.print(now.month(), DEC);
      myFile.print('/');
      myFile.print(now.day(), DEC);
      myFile.print(" ");
      myFile.print(now.hour(), DEC);
      myFile.print(':');
      myFile.print(now.minute(), DEC);
      myFile.print(':');
      myFile.print(now.second(), DEC);
      myFile.print(",");
      myFile.println(count);
      myFile.close();
      } else{
      Serial.println("error opening
test.txt");
    }

} lastState = sensorState;

lcd.setCursor(0,1);
  lcd.print(count);

}
```

INFRARED-BASED GAS FLOWMETER

CROSS REFERENCE TO RELATED APPLICATIONS

This application claims priority to U.S. Provisional Application No. 62/575,668 filed Oct. 23, 2017 and entitled "INFRARED-BASED GAS FLOWMETER."

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the INFRARED-BASED GAS FLOWMETER, which may be embodied in various forms. It is to be understood that in some instances, various aspects of the invention may be shown exaggerated or enlarged to facilitate an understanding of the invention. Therefore the drawings may not be to scale.

FIG. 6 is an embodiment of the script that can be uploaded to the Arduino UNO microcontroller using the provided software for Arduino systems.

BACKGROUND

Figure 1:
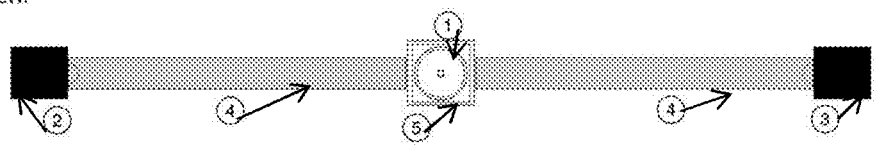
FIG. 1 shows an assembly view of the infrared-sensor liquid column design.
Figure 1:
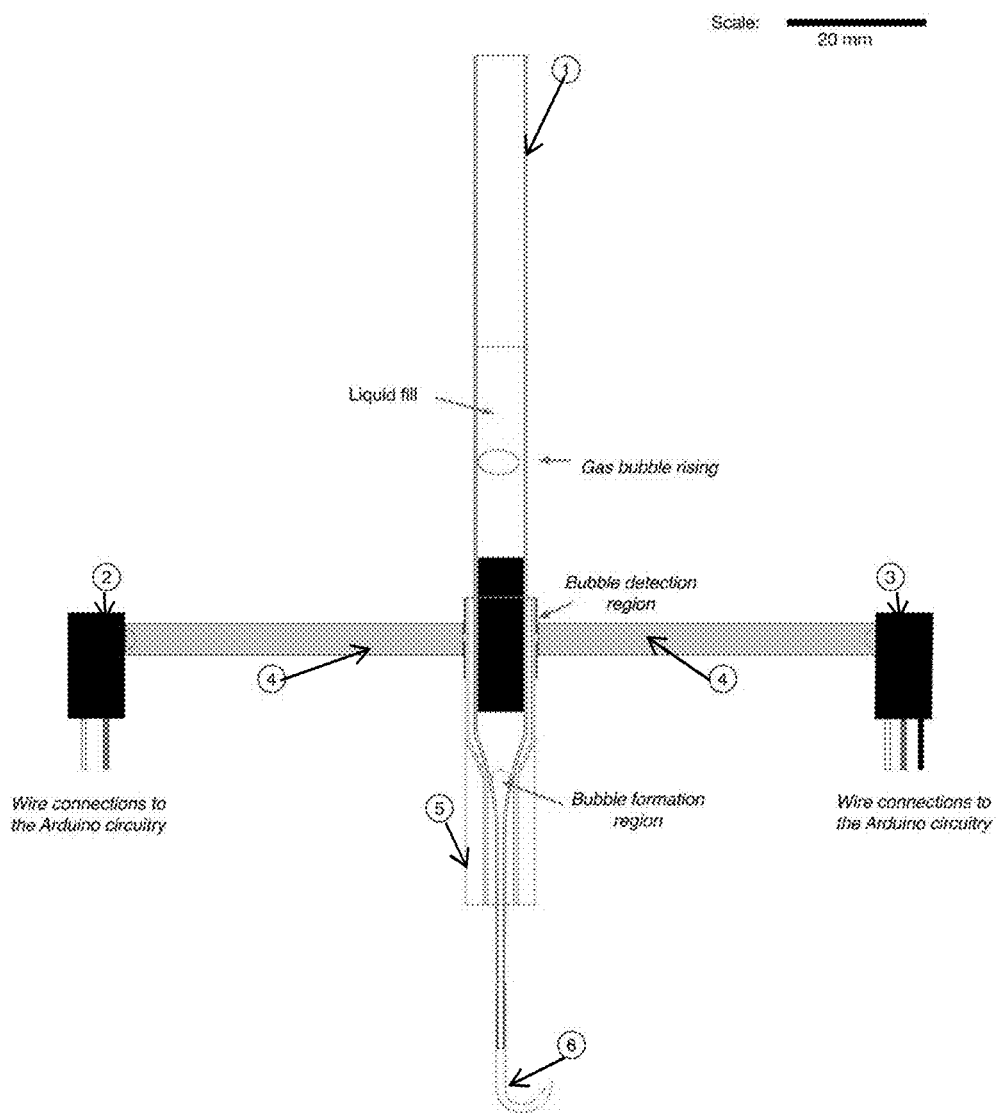

Gas flowmeters are valuable components of physical and biological systems that require measurement of gas flows for performance monitoring and process control. Gas flow measurement becomes challenging when flowrates are within the low-range regime (0.25 mL/min to 5,000 mL/min). In addition to flowrate, another challenge is the reactivity of gas-vapor components with contact elements in a flowmeter. Gas-vapor systems may be corrosive and non-corrosive.

The invention is a solution to the limitations of currently available gas flowmeter systems such as mass flowmeters, rotameters (variable area meters), and other IR-based bubble-through gas flowmeters, as applied to low-flowrate gas systems. A coriolis-type mass flowmeter relies on the vibrations of a tube system to measure the mass flowrate, which is then divided by the fluid density. Fluid density is significantly affected by temperature, pressure and gas composition. Rotameters measures flowrate by passing a gas stream into a variable cross-section area. A floating object is inserted in this flow tunnel to indicate flowrate level against a pre-calibrated graduation. Rotameters are not easily adaptable for electronic signal processing. Finally, a "bubble-through" type gas flowmeter works by passing the gas line through a liquid column; the bubble formation is correlated to gas volume. A bubble-through gas flowmeter utilizes a non-contact sensing mechanism. The detection unit, which is the gas bubble, passes through a detection region and vents out of the liquid column. Although a bubble-through design is the simplest setup that addresses the difficulty at low-flowrate regime, the bubble column of currently available bubble-through gas flowmeters is prone to significant back-flow volume due to pressure head. This effect results in a non-trivial alteration to the kinetics of gas flow.

Thus, there is a need for a bubble-through setup that can address the effects of back-flow volume through proper design of the region where gas enters and bubbles form. The sensing mechanism must also include a signaling setup that is not easily disturbed by extraneous effects such as changes in ambient light or vibrations/sound. A reliable signal system for this setup is an infrared beam, which is disturbed or "broken" only when a gas bubble passes through the infrared beam path. A gas flowmeter of this type may also be amenable to field applications, i.e., it may be portable to maximize its utility.

There are several potential applications for this invention. A sampling of those uses is presented below but is not meant to limit the invention. A person having ordinary skill in the art would understand that a flowmeter of this nature may have other uses as well. Such uses include biological applications such as (a) bench bioreactors and fermenters with gas production for application and laboratory reactors tracking gas generation for user; and (b) pilot bioreactors and fermenters with gas production for application and pilot-scale bioreactor operations for user. There are abiotic system uses such as (a) $O_2$ and $H_2$ generation for applications and batteries, and other electrolytic reactors for user; (b) $CO_2$ evolution gas measurement for application and respirometers for user; (c) and gas measurement for mass balance tracking from reactors for application and laboratory scale abiotic reactors. It can be used in analytical apparatus for (a) measurement of physical properties of fluids, both gases and liquids; and (b) interaction of infrared with fluids. There are biomedical and related uses such as (a) O2 and air supply in life support systems for biomedical use; (b) general-purpose gas supply systems for biomedical use; (c) gas flow testing applications for calibration and maintenance of gas supply in life support systems and other biomedical devices for users; and (d) non-biomedical life-support systems that involve O2, air and other gases. Finally, the assembly can be used in educational platforms such as (a) experimental sensor in learning lab and class for schools; (b) experimental setup for the study of physical properties and behavior of fluids; and (c) training kit in itself and/or component of a training kit for building modular measurement systems in learning lab and class for schools.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of materials, column shape, and circuitry. One skilled in the relevant art will recognize, however, that the INFRARED-BASED GAS FLOWMETER may be practiced without one or more of the specific details, or with other methods, components, materials, and so forth. In other instances, well-known structures, materials, or operations are not shown or described in detail to avoid obscuring aspects of the invention.

Figure 2:
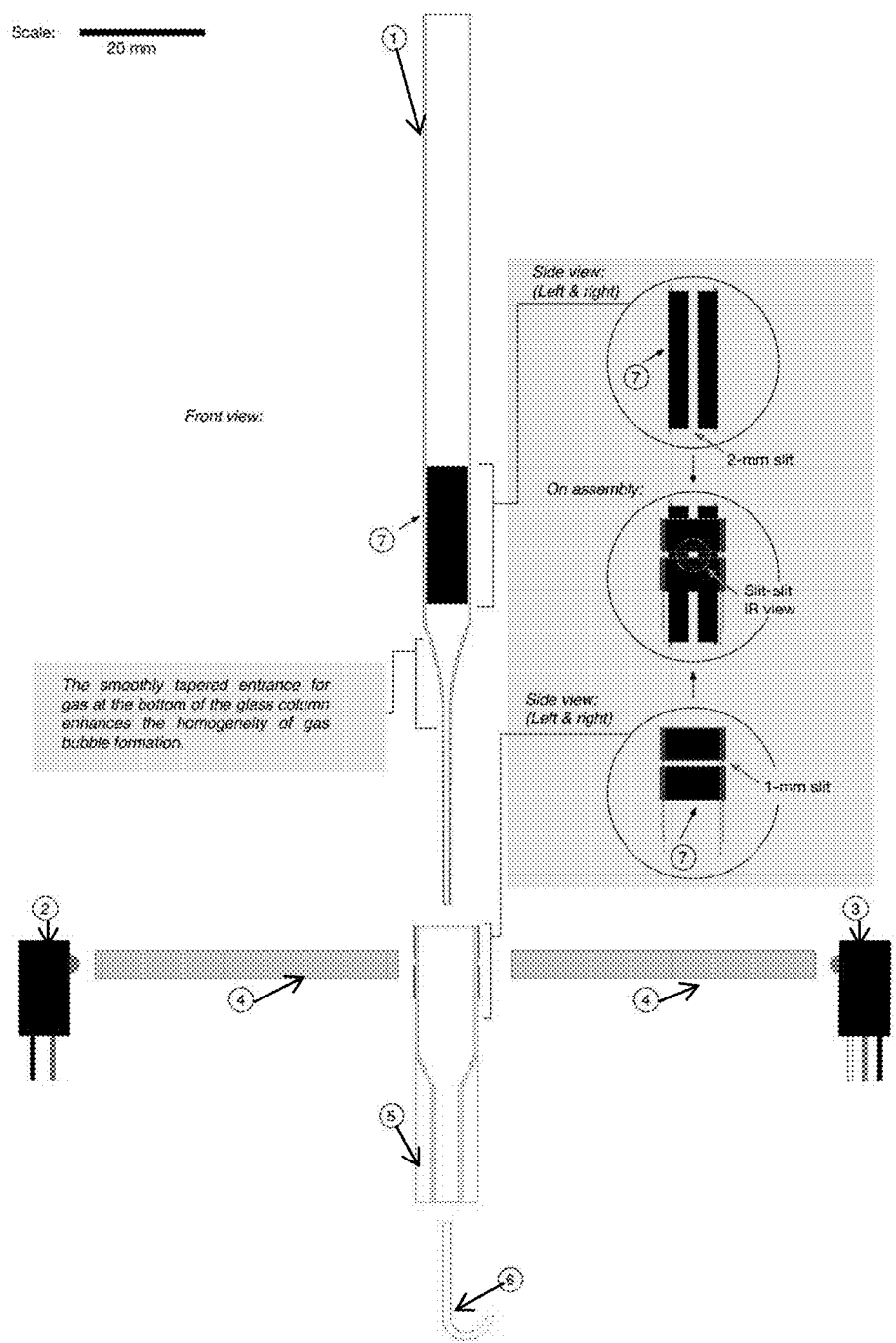
FIG. 2 shows an exploded view of the infrared-sensor liquid column design.

The invention is a gas flowmeter that produces precise flow measurements at low-flowrate ranges (for example, between 0.25 mL/min to 5,000 mL/min). An embodiment of the invention is show in FIGS. 1 and 2. It uses an infrared ("IR") beam to detect the passing of a gas bubble through a liquid within a glass column (FIGS. 1 & 2). A "broken" beam is detected by the microcontroller for each passing of a bubble. This ability to allow the IR beam to be broken exactly at the passing of a bubble is made possible by the slit-over-slit design at the sides of the glass column and the column holder (FIG. 2).

Figure 3:
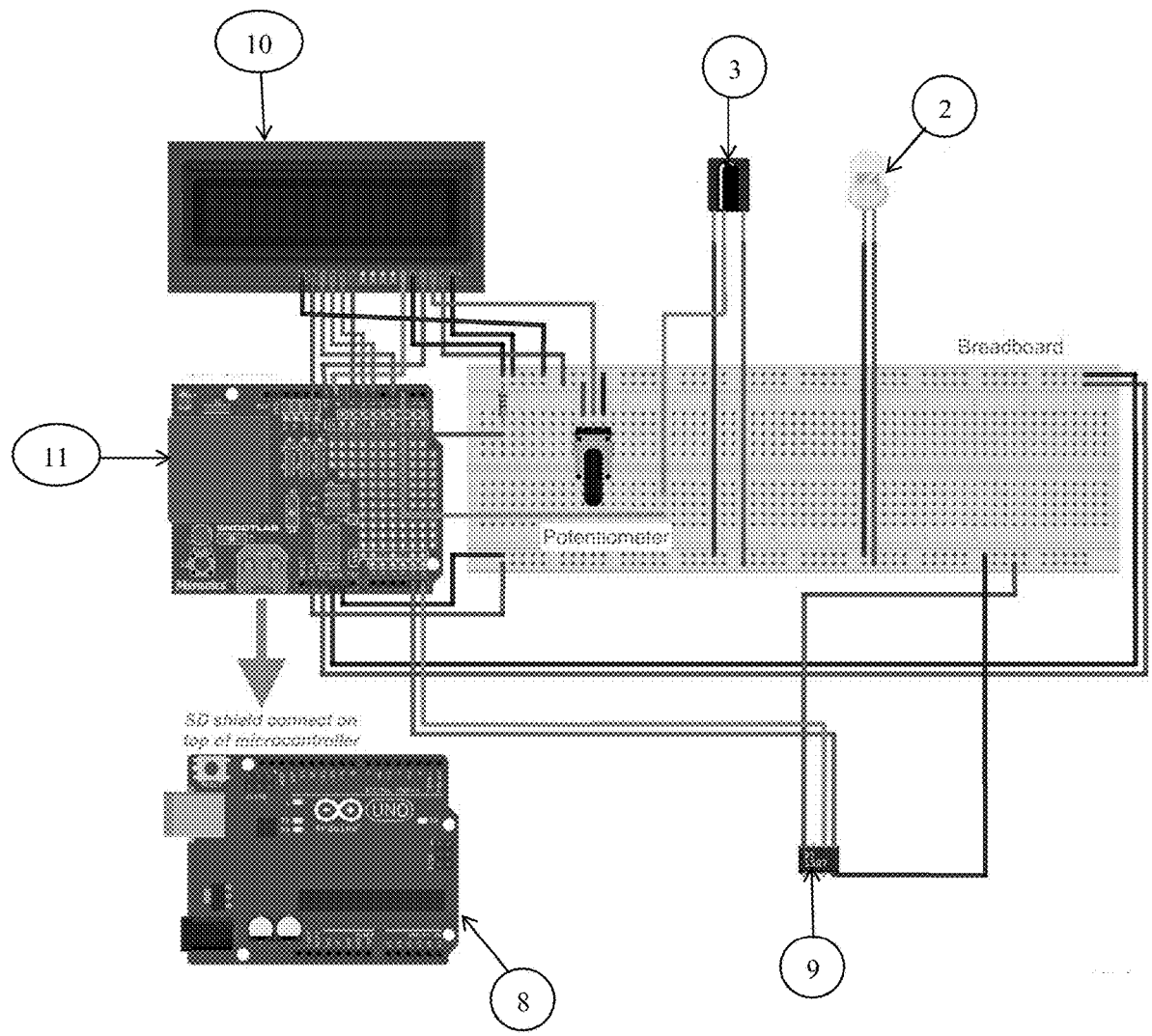
FIG. 3 depicts an embodiment of the circuitry.

According to FIGS. 1 and 2, the submersible flow meter comprises a cylindrical glass column 1, an IR transmitter 2, an IR receiver 3, tubing 4, a column holder 5, and gas inlet tube 6. The gas column 1 comprises the liquid fill and gas bubbles and is stabilized with the column holder 5. The bubbles are formed towards the gas inlet 6. The IR transmitter 2 and IR receiver 3 operate via a microcontroller 8 (FIG. 3). The microcontroller 8 powers the infrared sensor system and detects when the infrared beam is broken by a passing bubble. In one embodiment as shown in FIG. 3, the microcontroller is an Arduino UNO Microcontroller. It may be advantageous to power the microcontroller system by a DC battery to allow flow measurements without AC power supply. The infrared transmitter 2 and receiver 3 are connected at one end to a tube 4 and connected at another end to the microcontroller 8 circuitry. In one embodiment, the IR transmitter 2 and receiver 3 are aligned 110-mm apart, creating an infrared beam of that length. In one embodiment, the bulbs of the infrared transmitter 2 and receiver 3 are incased by a pair of infrared-opaque tubes.

To produce the gas bubbles, the flow line of a gas sample is connected at the bottom of the cylindrical glass column 1. In one embodiment, the cylindrical glass column 1 is infrared-transparent and comprises a smoothly tapered bottom tip. The smoothly tapered bottom tip of the cylindrical gas column 1 enhances the homogeneity of gas bubbles resulting in precise measurements. The tapered bottom tip minimizes the effect of pressure head on the discretization of gas to form bubbles, thereby reducing the backflow volume of the liquid-fill.

In one or more embodiments, the cylindrical glass column 1 comprises a bubble-through liquid design that accommodates a wide range of transparent liquids as liquid fill and accommodates a range of non-corrosive and corrosive gases and vapors. In one embodiment, the column has the following specifications: 5-100 mm bottom tip length, 0.1-10 mm bottom tip ID, 0.2-12 mm bottom tip OD, 5-200-mm body length, 0.2-20 mm body ID, 0.2-25 mm body OD.

As shown in FIG. 2, the cylindrical glass column 1 also includes a vertical slit and a horizontal slit at the bubble detection region. In this embodiment, the horizontal slits are oriented at the middle of the vertical slits forming a pound symbol. The slits are formed from an infrared-opaque material 7 that narrows down the infrared beam into the bubble detection section. In one embodiment, the slits are formed using electrical tape. As shown in FIG. 2, the vertical slit opening is 2 mm and the horizontal slit opening is 1 mm. However, the slit openings may vary based on the size of the assembly and as necessary for bubble detection. In other embodiments, the slits are between 0.1 and 5.0 mm in size. In one embodiment, a pair of infrared-opaque tubes which encase the infrared transmitter 2 and receiver 3, contact the horizontal slits at the sides of the column holder to further narrow down the infrared beam path.

Figure 4:
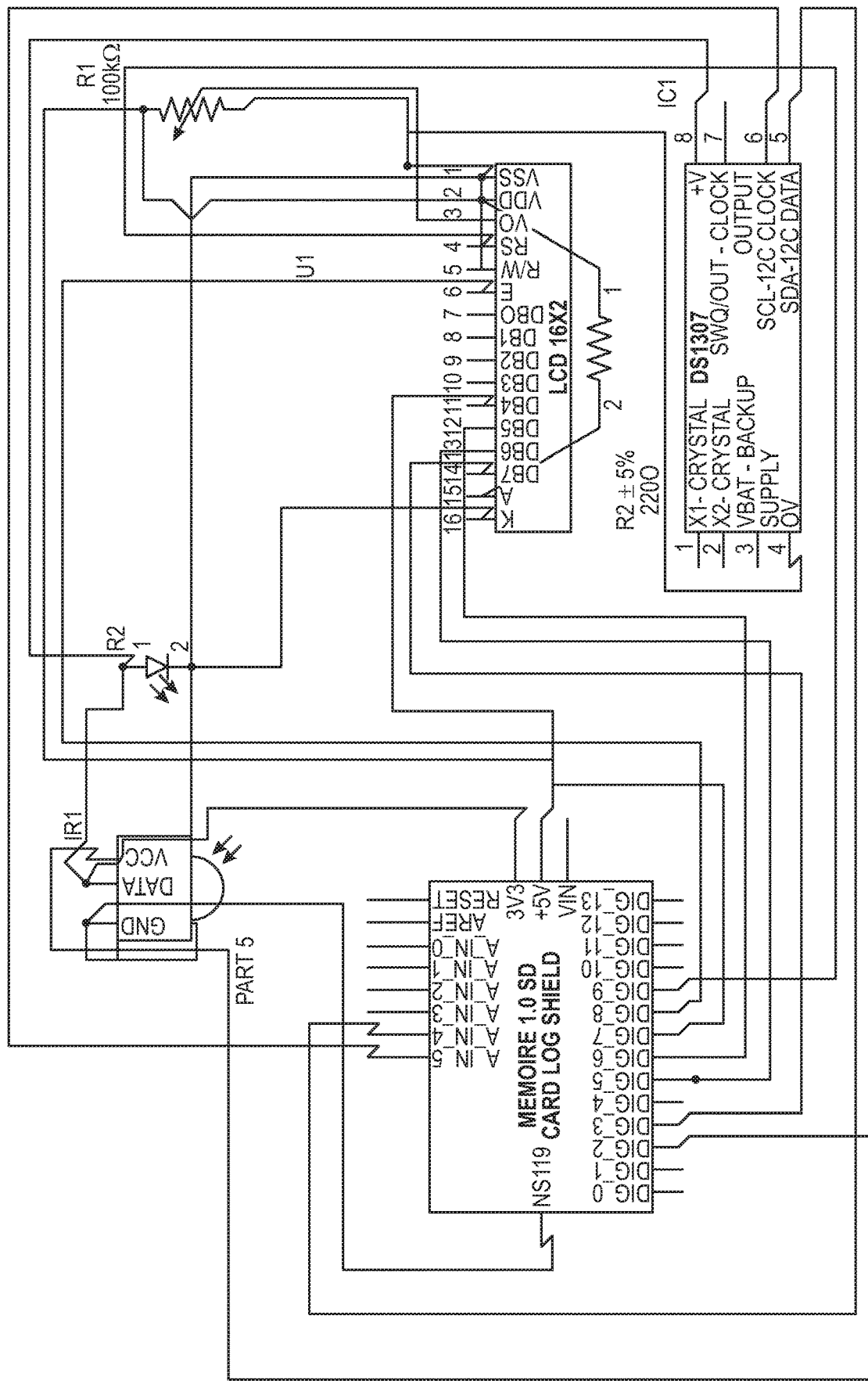
FIG. 4 is the circuit diagram for interfacing the SD card module, real-time clock module, LCD, and IR-sensor system.
Figure 5:
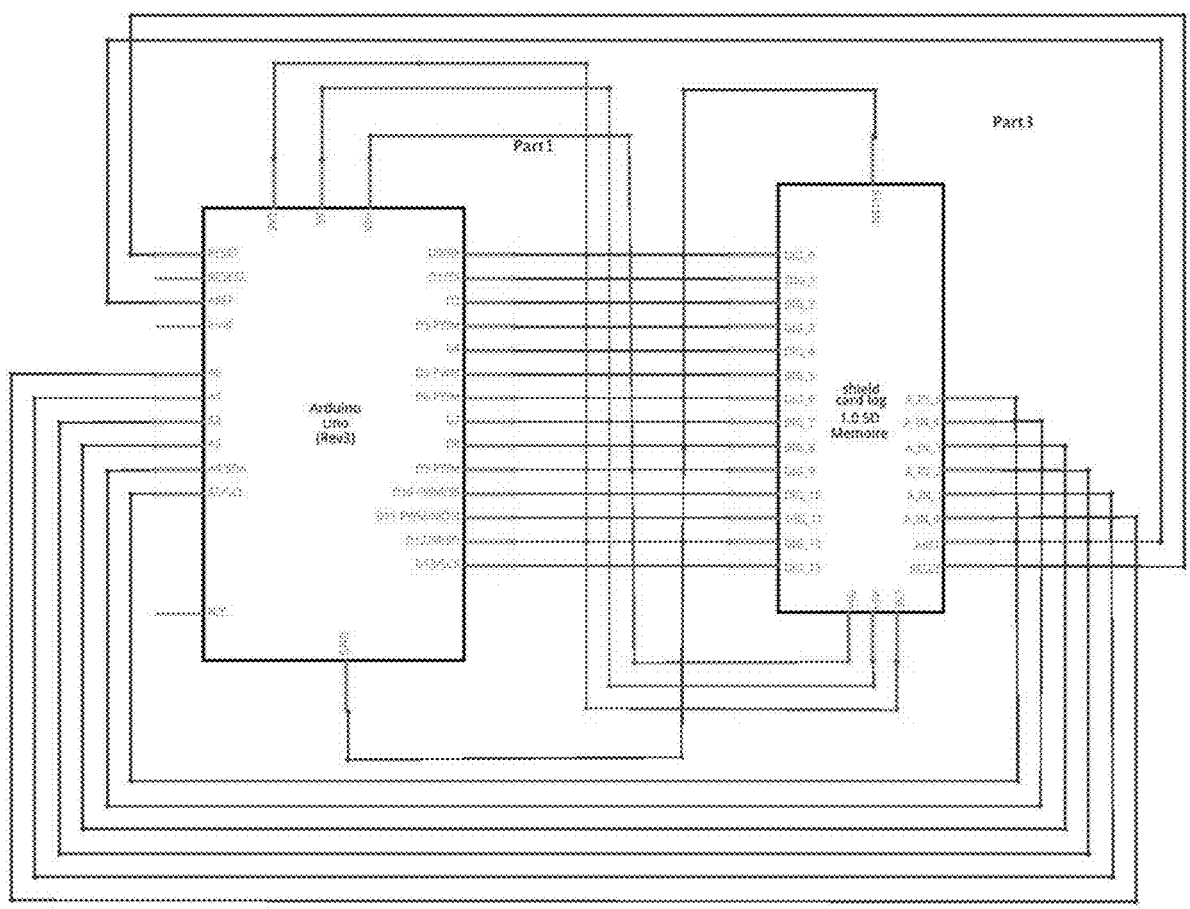
FIG. 5 is the circuit diagram for the interfacing of the Arduino UNO microcontroller and the SD card module.

A program script (FIG. 6) loops through signal detections, readings display, and data storage to record up to 500 bubble detection signals per second. The script includes a real-time clock module 9 that provides a timestamp for each detection signal. As shown in FIGS. 3-5, in one embodiment, the data-logging circuitry on the microcontroller records a timestamp and bubble count for each bubble signal as text file format into a memory card. Such a memory card is a secure digital ("SD") card in one or more embodiments. This embodiment includes a liquid crystal display ("LCD") 10 to display readings and a SD shield 11. In various embodiments, battery powered circuitry is used to keep the real-time clock module running during off-line, power-off periods. This function allows the timestamp to be corrected to accurately reflect periods of in-line, power-on operation.

In one embodiment, the assembly allows visual counter-checking of the number of bubbles registered on the LCD 10 and the actual passing of bubbles in the column 1. The visual check is a fundamental test during calibration and during device installation. In other embodiments, a data-logger coupled to a data visualization unit is used for instant evaluation of data and associated trends.

The assembly may also include a telecommunications module that can be added for distant monitoring using either satellite or internet data transmission. In other embodiments, the assembly is outputted with Bluetooth connectivity to a localized PC for direct data logging onto the PC.

With the high homogeneity of gas bubble production, a reliable linear calibration equation on the count-to-volume correlation can be made. This produces a conversion constant for bubble count to volume calculation. This conversion factor can be easily included in the program script for the microcontroller, or can be included in a post-run data analysis using a known processing software.

In one embodiment, the invention comprises multiple flowmeter assemblies. In this embodiment, the system is multi-channeled and capable of tracking numerous flowmeter systems.

For the purpose of understanding the INFRARED-BASED GAS FLOWMETER, references are made in the text to exemplary embodiments of an INFRARED-BASED GAS FLOWMETER, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the INFRARED-BASED GAS FLOWMETER may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

The invention claimed is:

1. A gas flowmeter comprising:
   a. a glass column comprising a bubble detection region,
   b. an infrared transmitter positioned such that said infrared transmitter transmits an infrared beam through said bubble detection region,
   c. an infrared receiver in communication with said infrared transmitter to receive said infrared beam through said bubble detection region, and
   d. a microcontroller in communication with said infrared transmitter and said infrared receiver adapted to detect when said infrared beam is broken in said bubble detection region.

2. The gas flowmeter of claim 1 wherein said glass column comprises a tapered bottom tip.

3. The gas flowmeter of claim 1 further comprising a program script capable of recording up to 500 bubble detection signals per second.

4. The gas flowmeter of claim 3 further comprising a real-time clock module that provides a timestamp for each said detection signal.

5. The glass flowmeter of claim 4 wherein said microcontroller records said timestamp into a memory card such as a secure digital card.

6. The gas flowmeter of claim 1 further comprising a vertical slit and a horizontal slit at said bubble detection region wherein said horizontal slit is oriented at the middle of said vertical slit.

7. The gas flowmeter of claim 6 wherein said vertical slit and said horizontal slit comprise infrared-opaque material.

8. The gas flowmeter of claim 1 wherein said microcontroller is powered by a DC battery.

9. The gas flowmeter of claim 1 wherein said microcontroller is powered by an AC power supply.

10. The gas flowmeter of claim 1 further comprising a visual counter-checking means.

11. The gas flowmeter of claim 1 further comprising a telecommunications module that may be monitored using either satellite or internet data transmission.

12. The gas flowmeter of claim 1 further comprising a Bluetooth connectivity means.

13. A bubble-through liquid column flowmeter comprising a tapered glass column with a slit-over-slit design at the sides of said glass column, an infrared transmitter that transmit an infrared beam across said tapered glass column to an infrared receiver, and a microcontroller in communication with said infrared transmitter and said infrared receiver that is capable of recording bubble count and a time stamp.

14. The flowmeter of claim 13 wherein said flowmeter is portable.

15. A system comprising at least two bubble-through liquid column flowmeters wherein each said at least two bubble-through liquid column flowmeters comprises a tapered class column with a slit-over-slit design at the sides of said glass column, an infrared transmitter, an infrared receiver, and a microcontroller capable of recording bubble count and a time stamp.

* * * * *